(12) United States Patent
Meng et al.

(10) Patent No.: US 12,478,391 B2
(45) Date of Patent: Nov. 25, 2025

(54) DEVELOPING STRUCTURE, STENT, AND THROMBECTOMY SYSTEM

(71) Applicant: MICROPORT NEUROTECH (SHANGHAI) CO., LTD., Shanghai (CN)

(72) Inventors: Fanhe Meng, Shanghai (CN); Juan Hou, Shanghai (CN); Ye Qian, Shanghai (CN); Chenyang Liu, Shanghai (CN)

(73) Assignee: MICROPORT NEUROTECH (SHANGHAI) CO., LTD., Shanghai (CN)

( * ) Notice: Subject to any disclaimer, the term of this patent is extended or adjusted under 35 U.S.C. 154(b) by 552 days.

(21) Appl. No.: 18/013,799

(22) PCT Filed: Aug. 19, 2021

(86) PCT No.: PCT/CN2021/113545
§ 371 (c)(1),
(2) Date: Dec. 29, 2022

(87) PCT Pub. No.: WO2022/002282
PCT Pub. Date: Jan. 6, 2022

(65) Prior Publication Data
US 2023/0355254 A1 Nov. 9, 2023

(30) Foreign Application Priority Data
Jun. 30, 2020 (CN) .......................... 202010621109.2

(51) Int. Cl.
A61B 17/22 (2006.01)
A61B 90/00 (2016.01)

(52) U.S. Cl.
CPC ...... *A61B 17/22* (2013.01); *A61B 2090/3966* (2016.02)

(58) Field of Classification Search
CPC .................. A61B 17/22; A61B 2090/3966
See application file for complete search history.

(56) References Cited

U.S. PATENT DOCUMENTS

| 5,725,572 A * | 3/1998 | Lam .................. A61B 90/39 |
| | | 623/1.34 |
| 5,741,327 A * | 4/1998 | Frantzen ............... A61F 2/91 |
| | | 606/198 |

(Continued)

FOREIGN PATENT DOCUMENTS

| CN | 102397590 A | 4/2012 |
| CN | 102429750 A | 5/2012 |

(Continued)

*Primary Examiner* — Phong Son H Dang
(74) *Attorney, Agent, or Firm* — MUNCY, GEISSLER, OLDS & LOWE, P.C.

(57) ABSTRACT

A radiopaque structure, a stent and a thrombectomy system are disclosed. The radiopaque structure includes: at least one protrusion each for securing, supporting and connecting a radiopaque sleeve (2); at least one radiopaque sleeve (2) disposed over the respective at least one protrusion; and at least one filler (3) filled in a gap between the radiopaque sleeve (2) and the protrusion. Compared with the prior art, the radiopaque mechanism can enhance fluoroscopic visibility of radiopaque dots disposed at a distal end of a laser-cut thrombectomy device and solves the problem that not all metal struts in the laser-cut thrombectomy device can be seen under fluoroscopic imaging. The radiopaque structure can be used in any types of stent and is not limited to being used in a thrombectomy device.

19 Claims, 9 Drawing Sheets

(56) References Cited

U.S. PATENT DOCUMENTS

| | | | | |
|---|---|---|---|---|
| 5,895,406 A * | 4/1999 | Gray | ........................ | A61F 2/915 606/198 |
| 5,922,020 A * | 7/1999 | Klein | ........................ | A61F 2/91 606/198 |
| 6,113,627 A * | 9/2000 | Jang | ........................ | A61F 2/915 623/1.49 |
| 6,190,403 B1 * | 2/2001 | Fischell | .................... | A61F 2/91 623/1.16 |
| 6,331,189 B1 * | 12/2001 | Wolinsky | ................ | A61F 2/915 623/1.15 |
| 2003/0216807 A1 * | 11/2003 | Jones | ...................... | A61F 2/915 623/1.22 |
| 2004/0254637 A1 * | 12/2004 | Yang | ........................ | A61F 2/91 623/1.34 |
| 2009/0204197 A1 * | 8/2009 | Dorn | ........................ | A61F 2/966 623/1.11 |
| 2010/0114298 A1 * | 5/2010 | Dorn | ........................ | A61F 2/91 623/1.34 |
| 2013/0345739 A1 * | 12/2013 | Brady | ............ | A61B 17/320725 606/200 |

FOREIGN PATENT DOCUMENTS

| | | | |
|---|---|---|---|
| CN | 103169556 | A | 6/2013 |
| CN | 103547235 | A | 1/2014 |
| CN | 106963451 | A | 7/2017 |
| CN | 107049421 | A | 8/2017 |
| CN | 107928747 | A | 4/2018 |
| CN | 109938801 | A | 6/2019 |
| CN | 210056361 | U | 2/2020 |
| CN | 113855352 | A | 12/2021 |
| DE | 10 2014 115 533 | A1 | 4/2016 |
| DE | 10 2018 107 594 | A1 | 10/2019 |
| DE | 10 2020 109 158 | A1 | 6/2021 |

* cited by examiner

DEVELOPING STRUCTURE, STENT, AND THROMBECTOMY SYSTEM

TECHNICAL FIELD

The present invention relates to the field of medical devices and, in particular, to a radiopaque structure, a stent and a thrombectomy system.

BACKGROUND

Stroke is an acute cerebrovascular disease clinically manifested mainly as cerebral ischemia and hemorrhagic injury. According to the Report on Stroke Prevention and Control in China published in 2018, stroke in China has the following five characteristics: high morbidity, high disability, high mortality, frequent recurrence and heavy economic burden. Stroke has become the first cause of death in China. On average, someone has a stroke every 12 seconds in China, and someone dies of a stroke every 21 seconds in China. According to a comprehensive standardized prevalence estimation made in 2016, there are as many as 1.96 million deaths of stroke in China every year, and 70% of the survivors suffer from permanent disabilities of varying degrees. Among all stroke patients, those with acute ischemic stroke (AIS) account for about 70-80%. For stroke treatment, it is crucial to restore cerebral blood flow as soon as possible before permanent damage occurs to the brain due to ischemia, in order to reduce secondary brain damage that may occur otherwise. At present, main available AIS therapies are pharmaceutical thrombolysis and mechanical thrombectomy.

Intra-arterial or intravenous pharmaceutical thrombolysis is commonly used in AIS treatment. Although this method has been demonstrated to be able to remarkably improve the prognosis of the nervous system, it is still associated with a number of problems. First, time windows left for thrombolysis are limited 3 hours for intravenous and 6 hours for intra-arterial, after the onset. Such limited time windows make the therapy suitable for only a small fraction of patients. Second, pharmaceutical thrombolysis requires a long time (at least 1-2 hours in intra-arterial and intravenous cases) to achieve revascularization, which may significantly affect clinical prognosis. Third, thrombolysis can be suitably used in the treatment of only small thrombi and is associated with a low success rate in revascularization for severe large vessel occlusion (LVO) AIS cases. Fourth, some patients are not suitable for thrombolysis.

In order to circumvent the above problems with pharmaceutical thrombolysis, mechanical removal of thrombi has become a hot topic of research in recent years. Since 2015, intra-arterial mechanical thrombectomy has ushered in an era of development in the field of AIS treatment—the five well-known clinical trials published, MR CLEAN, ESCAPE, EX-TENDIA, SWIFT PRIME and REVASCAT, have confirmed the efficacy of endovascular mechanical thrombectomy, kicking off the new era of interventional treatment of AIS. In the United States, South Korea, Canada, Europe and China, related treatment guidelines have been successively revised to recommend mechanical thrombectomy as the first choice therapy for anterior circulation LVO AIS. Intra-arterial mechanical thrombectomy devices have gained widespread attention thanks to their a wide range of advantages including faster revascularization, an extended time window left for stroke intervention, less bleeding and satisfactory clinical revascularization results especially for LVO AIS.

Existing intracranial thrombectomy devices are typically metal stents fabricated using laser cutting. However, these metal stents are still associated with many problems. One major problem is that such a metal stent typically includes a set of radiopaque dots or wires, which enable the position or contour of the metal stent to be identified under X-ray during a surgical procedure. However, not all metal struts in the laser-cut metal stent can be seen, making a physician impossible to determine, during the surgical procedure, release and local expansion conditions of the metal stent, as well as, entrapment conditions of a thrombus by the metal struts. Therefore, this is unfavorable to the physician's operation during the surgical procedure.

Currently, the thrombectomy system that is most accepted among those available in the market by physicians in China and abroad in the treatment of acute intracranial thrombosis is a stent-based thrombectomy system employing a laser-cut nickel-titanium stent for thrombus capture and removal. This stent can be delivered over a microcatheter to a target lesion site and then released so as to capture the thrombus. Upon achieving this, it is retracted together with the thrombus into a guide catheter with a larger inner diameter, and both are then withdrawn from the patient's body. However, this system is provided with only a number of radiopaque dots around the distal end of the thrombectomy device. According to clinical reports, during the use of this system for thrombectomy, a physician could not determine release and local expansion conditions of the thrombectomy device under X-ray, but can know whether thrombus removal is achieved only after the thrombectomy device has been withdrawn from the human body. This is unfavorable to a physician's decision-making during a surgical procedure and may cause a waste of precious time.

Figure 1:
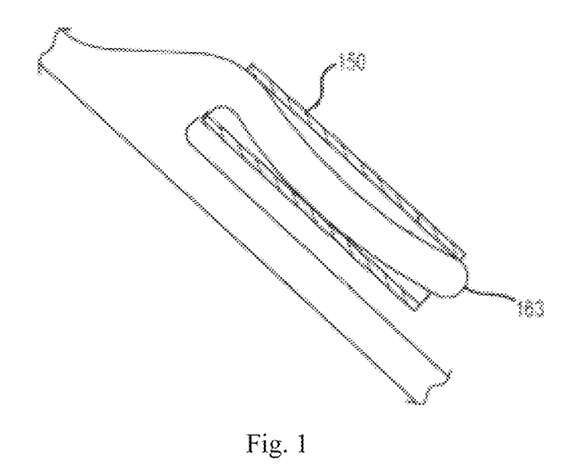
FIG. 1 shows the structure of a marker in a conventional thrombectomy device.
Figure 2:
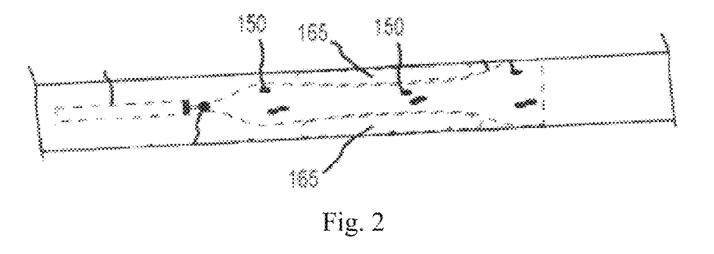
FIG. 2 schematically illustrates fluoroscopic visibility of the thrombectomy device that has come into contact with a thrombus but not expanded fully.

In order to provide improved fluoroscopic visibility, there has been developed a thrombectomy device for endovascular use, which is structured essentially the same as the above stent-based thrombectomy system, except for multiple sets of arched markers distributed along a length of the stent, in addition to the multiple radiopaque dots disposed around the distal end of the stent. These markers can help an operating physician determine the position and orientation of the thrombectomy device within a blood vessel. The structure of such a marker is shown in FIG. 1. In FIG. 1, the marker 150 is made of a radiopaque material and includes an arched metal strut segment 163, which is joined to a metal strut 114 in the main part of the nickel-titanium stent. The segment and the strut is fabricated using laser cutting in one pass. FIG. 2 shows fluoroscopic visibility of the thrombectomy device, which has come into contact with a thrombus 165 in a blood vessel but not expanded fully. As shown, the fluoroscopic visibility of the thrombectomy device is still suboptimal.

SUMMARY OF THE INVENTION

In view of the above-described shortcomings of the prior art, it is an objective of the present invention to provide a radiopaque structure, a stent and a thrombectomy system. Compared with the prior art, the present invention can enhance fluoroscopic visibility of radiopaque dots disposed around a distal end of a laser-cut thrombectomy device. The radiopaque structure of the present invention can be used in any type of stent and is not limited to being used in a thrombectomy device.

To this end, the present invention lies in a radiopaque structure including:

at least one radiopaque sleeve disposed over at least one protrusion;

at least one filler filled in a gap between the radiopaque sleeve and the protrusion.

Optionally, the radiopaque structure may further include at least one body radiopaque wire.

Optionally, body radiopaque wire may be wound along one of struts defining mesh openings in the stent.

Optionally, there may be 0-8 body radiopaque wires on the stent, each having a length ranging from 10 mm to 150 mm.

Optionally, the body radiopaque wire and the radiopaque sleeve may be made of the same material or different materials.

Optionally, the body radiopaque wire may be of a pure metal and/or an alloy radiopaque to X-ray radiation and have a diameter of 0.01 mm to 0.1 mm.

Optionally, the at least one protrusion may be at least one rod provided at at least one end of the stent.

Optionally, the at least one rod may be notched or slotted at a free end thereof.

Optionally, the notching or slotting may occur at at least one location.

Optionally, the at least one rod may have any of an arched shape, a crescent shape, a zigzag shape, a tapered shape, a trapezoidal shape and an oval shape.

Optionally, the at least one protrusion may be integrally formed with or fixedly connected to the stent.

Optionally, the radiopaque sleeve may be a radiopaque tube or a radiopaque spring.

Optionally, the radiopaque spring may be fabricated from a wire and have an inner diameter of 0.03 mm to 1 mm.

Optionally, the wire may be of a pure metal and/or an alloy radiopaque to X-ray radiation and have a diameter of 0.01 mm to 0.1 mm.

Optionally, the filler may be provided by wire(s) and/or a polymer filling material mixed with a radiopaque material, the wire(s) including an extension of a radiopaque wire from which the radiopaque sleeve is fabricated and/or a separate radiopaque wire.

Optionally, the filler may be provided by wire(s) and/or a polymer filling material mixed with a radiopaque material, the wire(s) including one or more of an extension of a radiopaque wire from which the radiopaque sleeve is fabricated, an extension of the body radiopaque wire and a separate radiopaque wire.

Optionally, the separate radiopaque wire may have a length of 10 mm to 100 mm Optionally, the wire(s) may include a first trailing end integrally joined to the radiopaque sleeve.

Optionally, the first trailing end and the radiopaque sleeve may be joined at a free end of the protrusion so that the radiopaque sleeve and the first trailing end form a first closed loop.

Optionally, the wire(s) may include a second trailing end integrally joined to the body radiopaque wire.

Optionally, the wire(s) may further include a first trailing end integrally joined to the radiopaque sleeve.

Optionally, the first trailing end and the second trailing end may be inserted in the gap between the protrusion and the radiopaque sleeve.

Optionally, the first trailing end, the second trailing end, the radiopaque sleeve and the protrusion may be welded together at the free end of the protrusion to form a single closed end structure.

Optionally, the radiopaque structure may include a body radiopaque wire, wherein the protrusion is at least one rod provided at at least one end of the stent, wherein the rod is connected to a strut in the stent, wherein the first trailing end is wound around a lower end of the rod and inserted into the gap between the radiopaque sleeve and the rod in such a manner that the first trailing end has a wrapped ring around the lower end of the rod, and wherein the body radiopaque wire is wound along the strut and then hooked about the wrapped portion.

Optionally, the body radiopaque wire may be wound on one side of the stent strut, hooked about the wrapped portion of the first trailing end around the lower end of the rod and then wound along the same path back on the same side of the strut.

Optionally, the body radiopaque wire may be wound on one side of the stent strut, hooked about the wrapped portion of the first trailing end around the lower end of the rod and then wound along a different path on the other side of the strut.

Optionally, the protrusion may be at least one rod provided at at least one end of the stent, wherein the rod is connected to a strut in the stent, and wherein the first trailing end is wound around a lower end of the rod, inserted into the gap between the radiopaque sleeve and the rod, wound back around a free end of the rod, and again inserted into the gap between the radiopaque sleeve and the rod.

Optionally, the first trailing end may fill the gap between the radiopaque spring and the rod and then extend as the body radiopaque wire wound along the strut.

The present invention further provides a stent including the radiopaque structure as defined above, wherein the protrusion is fixedly connected to or integrally formed with the stent The present invention further provides a thrombectomy system including the stent as defined above.

Compared with the prior art, the present invention has the following benefits:

1. The filler added in the radiopaque sleeve can enhance fluoroscopic visibility and friction between the radiopaque sleeve and the protrusion, avoiding easy separation of the radiopaque sleeve from the protrusion.
2. A "double stranded" body radiopaque wire can be obtained by hooking a radiopaque wire to the wrapped ring of the first trailing end of the filler and then winding it back along the same path on the stent.
3. The first trailing end of the filler may be wound around the junction of struts in the stent, inserted into the interior of the radiopaque spring and then welded to the rod at the free end thereof. In this way, the rod and radiopaque spring together form a close loop, which not only increases tensile strength of the radiopaque spring but also reduces the risk of the radiopaque spring falling off the stent's distal end. Through clamping the first trailing end in the gap between the rod and the radiopaque spring, the radiopaque spring and the first trailing end form a self-locking by virtue of friction therebetween.
4. The first trailing end of the radiopaque spring may be wound around the lower end of the rod and passed through between, near the junction of, two struts that define a V-like shape in such a manner that the first trailing end is wrapped around the junction. The wrapping can avoid the formation of a fused metal wire end at a proximal end of the stent. Instead, a smooth transition will be present, which can reduce damage to the endothelium of a blood vessel.

5. Interconnection of the rod, radiopaque sleeve, filler and radiopaque wire may be accomplished in various manners, significantly improving the stent's overall contour and mitigating the problem that the stent cannot be entirely fluoroscopically visible.

In these figures, 101—rod; 102—strut in a stent; 103—proximal end portion; 104—distal end portion; 105—lower end of a rod; 106—notch; 107—free end; 11—stent; 2—radiopaque sleeve; 3—filler; 301—first trailing end; 302—second trailing end; 4—body radiopaque wire.

DETAILED DESCRIPTION

Objectives, aspects and advantages of the present invention will become more apparent from the following detailed description of embodiments thereof, which is to be read in conjunction with the accompanying drawings. It will be understood that the specific embodiments are presented herein merely for the purpose of illustration rather than limitation.

The radiopaque structure, stent and thrombectomy system sought to be protected hereby will be described in detail below by way of specific examples with reference to the annexed figures, as will be appreciated by those skilled in the art.

Embodiment 1

Figure 3:
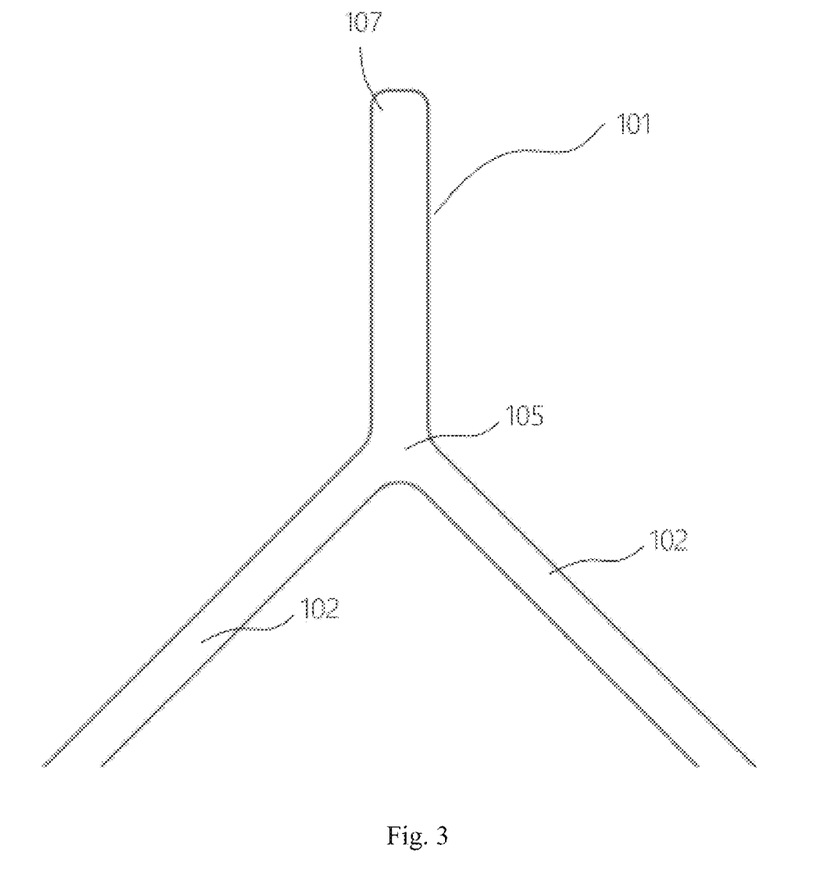
FIG. 3 is a schematic diagram illustrating the structure of a free rod connected to struts at a distal end of a stent in a radiopaque structure according to an embodiment of the present invention.
Figure 4:
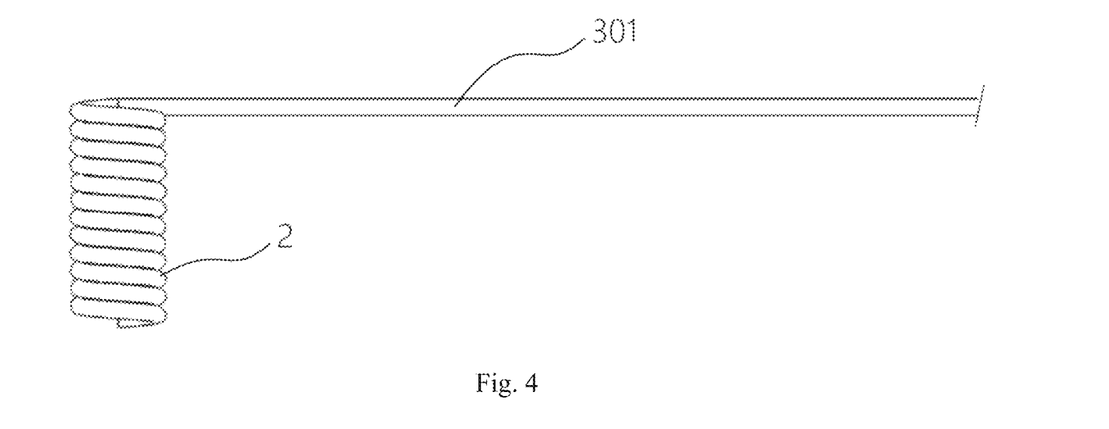
FIG. 4 is a schematic diagram illustrating the structure of a radiopaque spring having a first trailing end in a radiopaque structure according to an embodiment of the present invention.
Figure 5:
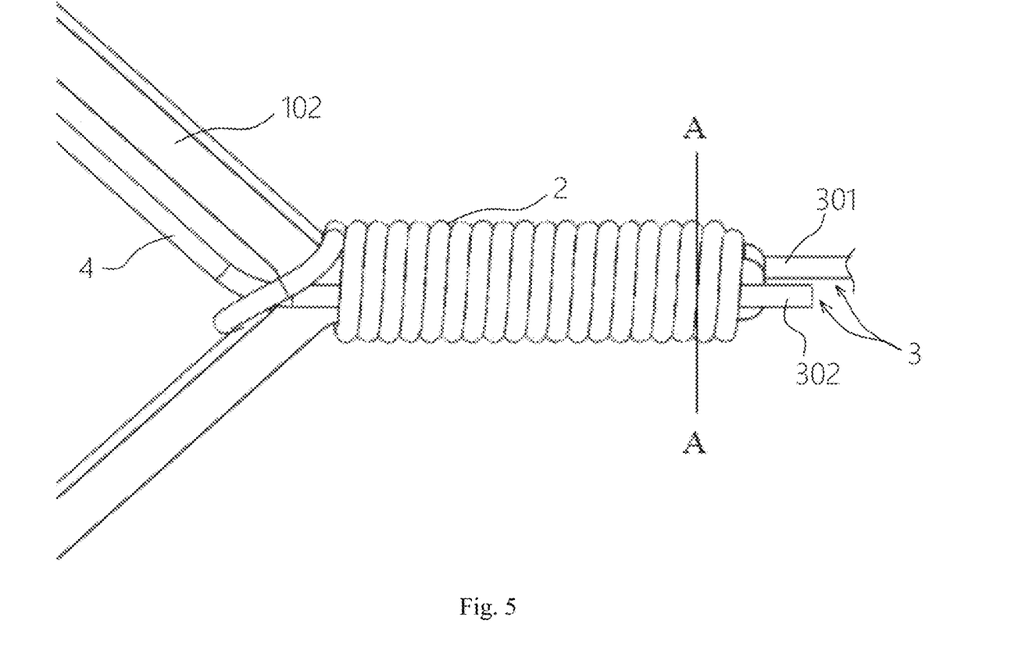
FIG. 5 is a main view of a radiopaque structure according to a first embodiment of the present invention.
Figure 6:
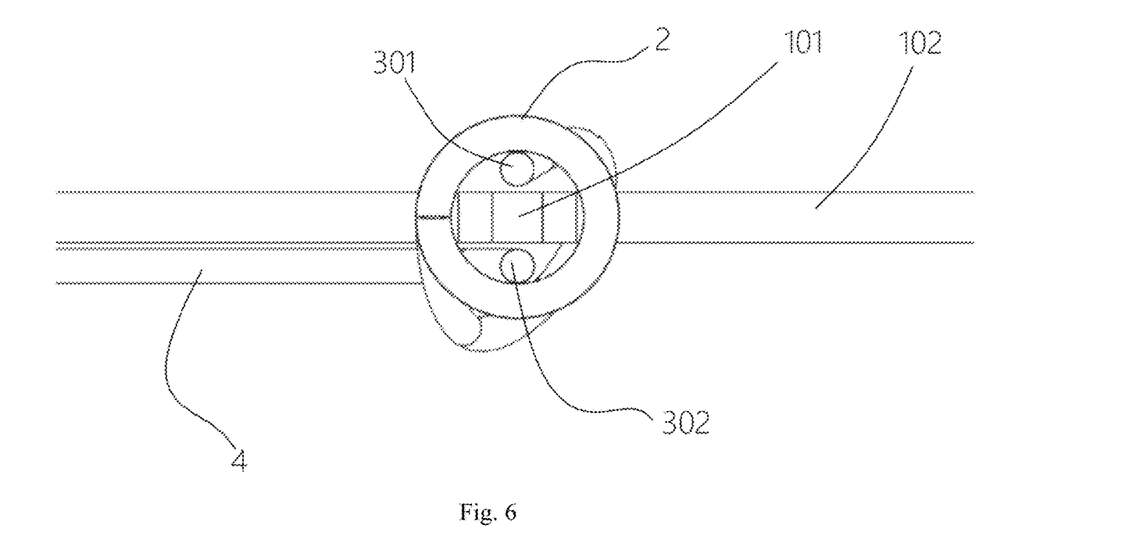
FIG. 6 is a cross-sectional view of the radiopaque structure taken along line A-A according to the first embodiment of the present invention.
Figure 7:
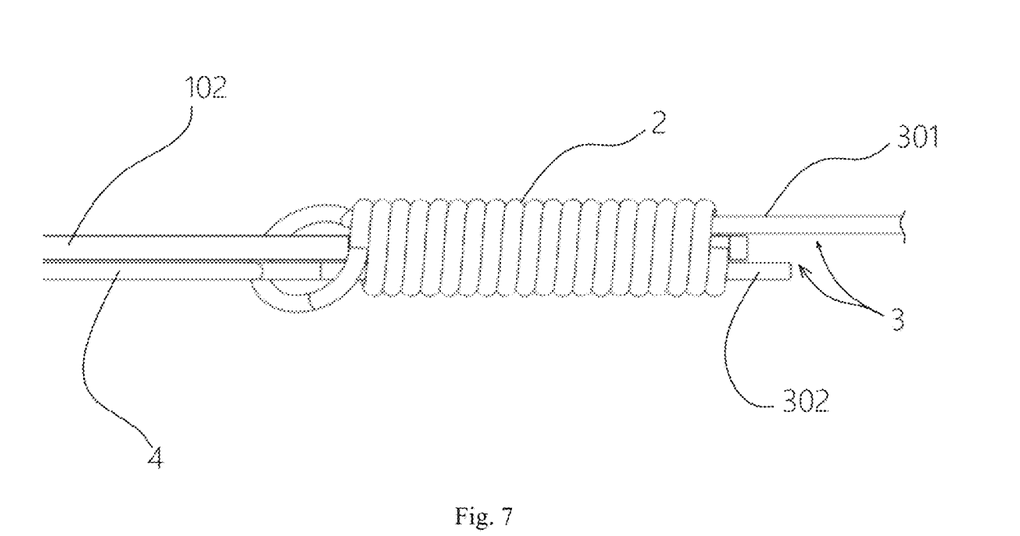
FIG. 7 is a front view of the radiopaque structure according to the first embodiment of the present invention.

FIG. 3 is a schematic diagram illustrating the structure of a free rod connected to struts at a distal end of a stent in a radiopaque structure according to an embodiment of the present invention. FIG. 4 is a schematic diagram illustrating the structure of a radiopaque spring having a first trailing end in the radiopaque structure according to an embodiment of the present invention. FIG. 5 is a main view of a radiopaque structure according to a first embodiment of the present invention. FIG. 6 is a cross-sectional view of a radiopaque structure taken along line A-A according to the first embodiment of the present invention. FIG. 7 is a front view of a radiopaque structure according to the first embodiment of the present invention.

Referring to FIGS. 3 to 8, the radiopaque structure includes:

at least one protrusion for securing, supporting and connecting a radiopaque sleeve 2. The at least one protrusion is at least one rod 101 formed at respective at least one end of the stent 11. Preferably, the protrusion may resemble an arched structure (as shown in FIG. 1, labeled at 163). The protrusion may be provided by any strut in the stent. Alternatively, it may be any protrusion adapted for disposal of the radiopaque sleeve 2 thereover. Still alternatively, it may be a protrusion as shown in FIG. 3. In the first embodiment, the protrusion of FIG. 3 is preferred, which includes a vertical rod 101, a lower end 105 of the rod 101 is joined to struts 102 in the stent 11. The rod 101 may have any one of an arched shape, a crescent shape, a zigzag shape, a tapered shape, a trapezoidal shape and an oval shape. In the first embodiment, the rod 101 in the radiopaque structure is preferably provided at a distal end 104 of the stent 11.

A free end 107 of the rod 101 may be notched or slotted, or a free end of the rod may not be notched or slotted. As shown in FIG. 3, it is preferred that the free end 107 of the rod 101 in the radiopaque structure according to the first embodiment is not notched or slotted. The free end 107 of the rod 101 is its leading end that is not fixedly connected to the stent.

Figure 8:
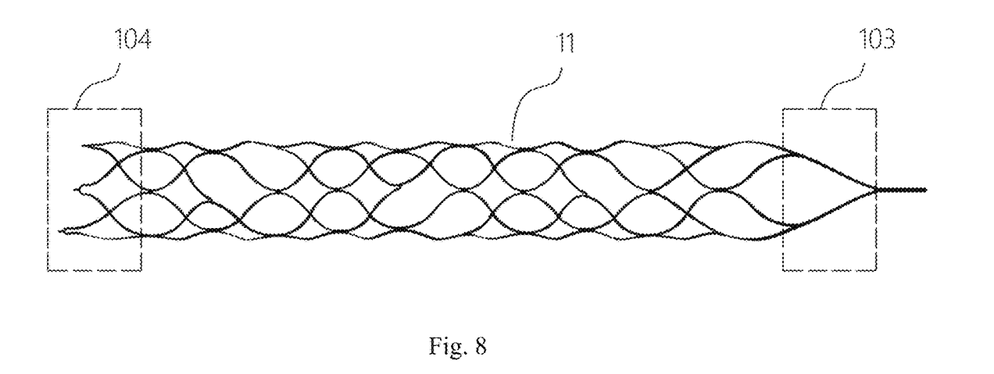
FIG. 8 is a schematic diagram illustrating the structure of a stent in the radiopaque structure according to the first embodiment of the present invention.

Preferably, in the radiopaque structure according to the first embodiment, the stent 11 is a self-expanding stent fabricated using laser cutting. As shown in FIG. 8, the stent 11 is a closed ring-shaped structure, which can be partially or wholly retracted into a microcatheter. The stent 11 may include any one of V-shaped struts 102, U-shaped struts 102, sinusoidal struts 102 and parabolic struts 102. In the radiopaque structure according to the first embodiment, the stent preferably includes V-shaped struts 102, as shown in FIG. 3.

Figure 9:
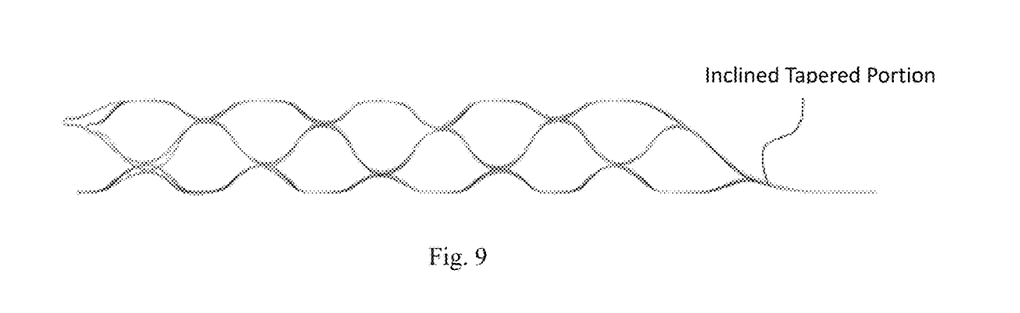
FIG. 9 schematically illustrates an inclined tapered portion of the stent according to the first embodiment of the present invention.

As shown in FIG. 9, the stent 11 has an inclined tapered proximal end portion 103 with a length of 5-15 mm and an angle of 20-60° with respect to a horizontal plane. The stent 11 has a distal end portion 104, which is a closed ring-shaped structure with mesh openings therein, the number of the mesh openings is 2-8. Preferably, in the radiopaque structure according to the first embodiment, the length of the inclined tapered portion is 11 mm, and its angle with respect to the horizontal plane is 35°. Moreover, there are three mesh openings in the closed ring-shaped structure. The rod 101 may be integrally formed with the stent 11 during the fabrication thereof by laser cutting. Alternatively, the rod 101 may be fabricated separately and then welded to the stent 11 fabricated using laser cutting.

With regard to the at least one radiopaque sleeve 2, the at least one radiopaque sleeve 2 is disposed over the respective at least one protrusion. Each radiopaque sleeve 2 is a hollow structure, the radiopaque sleeve 2 is such as a radiopaque tube or spring. The radiopaque tube may be formed of a radiopaque metal such as a platinum-gold, platinum-iridium alloy or platinum-tungsten alloy. The radiopaque spring may have an inner diameter ranging from 0.1 mm to 0.5 mm Preferably, in the first embodiment, the inner diameter of the radiopaque spring is 0.2 mm. The radiopaque spring may be formed of a wire of a metal or alloy that is radiopaque to X-ray radiation, such as a platinum-gold alloy, platinum-iridium alloy or platinum-tungsten alloy. The wire may have a diameter of 0.03-0.1 mm Preferably, in the radiopaque structure according to the first embodiment, the radiopaque sleeve 2 is provided by the radiopaque spring, and the diameter of the wire is 0.05 mm.

With regard to the at least one filler 3, the at least one filler 3 fills a gap between the radiopaque sleeve 2 and the protrusion. The filler 3 may be provided by any of a first trailing end 301 and/or a second trailing end 302, at least one separate radiopaque wire and a polymer filling material, or a combination thereof.

Preferably, as shown in FIG. 4, in the radiopaque structure according to the first embodiment, the filler 3 is provided by the first trailing end 301 and the second trailing end 302. The first trailing end 301 is integrally joined to the radiopaque spring, while the second trailing end 302 is integrally joined to a body radiopaque wire 4.

The body radiopaque wire 4 may be a metal or alloy radiopaque to X-ray radiation and may have a diameter ranging from 0.01 mm to 0.1 mm. The stent 11 may contain 0-8 such body radiopaque wires 4, each body radiopaque wire 4 has a length of from 100 mm to 200 mm. In the radiopaque structure according to the first embodiment, each body radiopaque wire 4 has a diameter in the range of from 0.01 mm to 0.1 mm, with 0.05 mm being preferred, each body radiopaque wire 4 has a length of 100 mm, there are 3 body radiopaque wires 4 in the stent 11.

In the first embodiment, there is also provided a method of interconnection of the rod 101, the radiopaque sleeve 2, the filler 3 and the body radiopaque wire 4 in the radiopaque structure, which includes the steps detailed below.

The radiopaque spring is disposed over the rod 101.

The first trailing end 301 is passed through the gap between the radiopaque spring and the rod 101. As shown in FIGS. 4 to 7, the first trailing end 301 of the radiopaque spring may be wound around the lower end 105 of the rod and passed through the junction of the two struts 102 that define a V-like shape, such that the first trailing end 301 is arrived at the other side of the rod 101, the first trailing end 301 is passed through the gap between the radiopaque spring and the rod 101 toward the free end 107 of the rod 101.

The second trailing end 302 is passed through the gap between the radiopaque spring and the rod 101. As shown in FIG. 5, an end of the second trailing end 302 may be passed toward the free end 107 of the rod 101 through the interior of the radiopaque spring such that the first trailing end 301 and the second trailing end 302 are located on opposing sides of the rod 101, as shown in FIG. 6. Subsequently, unwanted portions of the first trailing end 301 and the second trailing end 302 may be removed, and the remainders of them may be welded to the free end 107 of the rod 101 in such a manner that the materials of the first trailing end 301 of the radiopaque spring and the second trailing end 302 are fused during the welding process and together form a single spherical cap which provides a closed end. As such, the spherical cap (i.e., the closed end) provides a distal end of the radiopaque spring, a terminal end of the first trailing end 301, a terminal end of the second trailing end 302 and the leading end of the rod 101. As a proximal end portion of the radiopaque spring continues with the first trailing end 301, as a result of the formation of the spherical cap in the welding process, the radiopaque spring is joined to the first trailing end 301 at both the proximal and distal ends, resulting in the formation of a closed loop. The spherical cap may act to connect and secure the radiopaque spring, preventing it from falling off.

Figure 10:
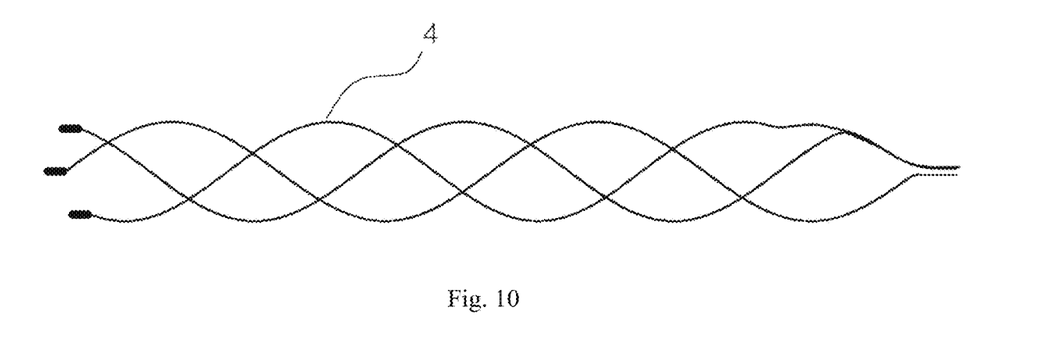
FIG. 10 is a schematic diagram illustrating the structure of the radiopaque structure according to the first embodiment, including body radiopaque wires in the stent.

As shown in FIG. 5, the body radiopaque wire 4 connected to the other end of the second trailing end 302 is wound around the struts 102 of the stent 11. The radiopaque structure in the case of three body radiopaque wires 4 is as shown in FIG. 10.

Figure 11:
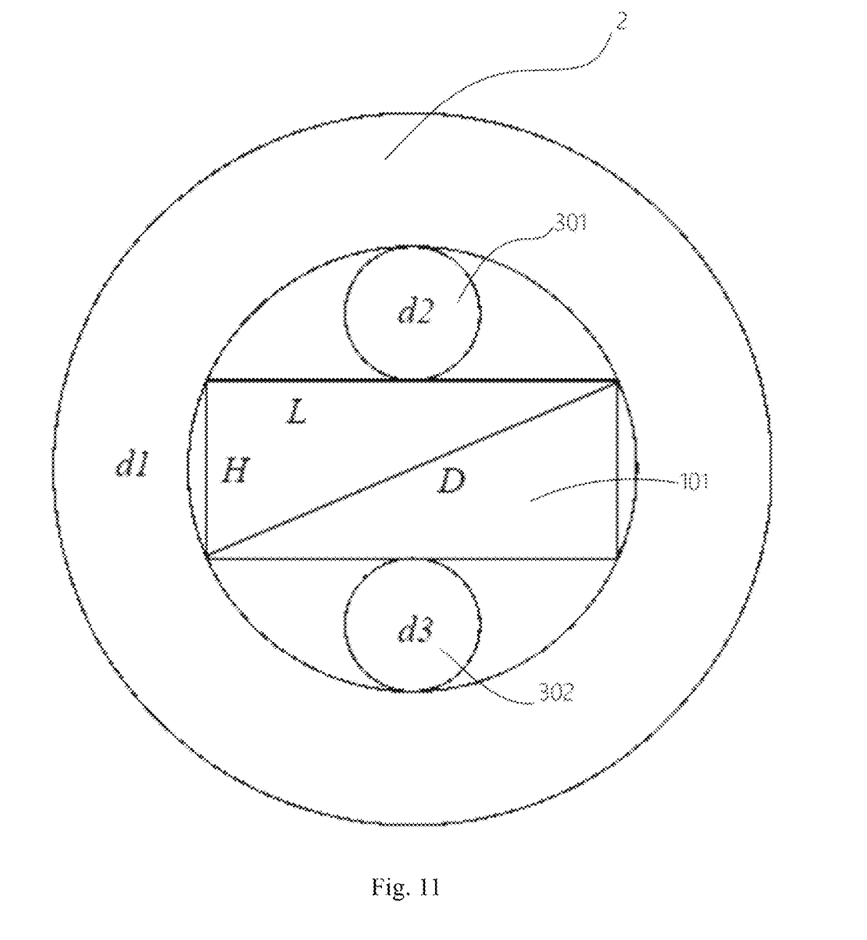
FIG. 11 is a cross-sectional view of the radiopaque structure according to the first embodiment.

FIG. 11 is a cross-sectional view of the radiopaque structure. A projection of the rod 101 from the top has a length L and a height H, and the metal wire of the radiopaque spring has an outer diameter d1. Moreover, the metal wire of the first trailing end 301 has a diameter d2, and the metal wire of the second trailing end 302 has a diameter d3. The diameters d1, d2 and d3 may be equal or not. The radiopaque spring has an inner diameter D, a maximum cross-section of the projection of the rod 101 from the top is tangent to an inner circle of a projection of the radiopaque spring (this can avoid instability of the radiopaque spring). Further, Formulae 1 and 2 below are satisfied:

$$H^2+L^2=D^2 \qquad (1)$$

$$D \geq H+d2+d3 \qquad (2)$$

Embodiment 2

Figure 12:
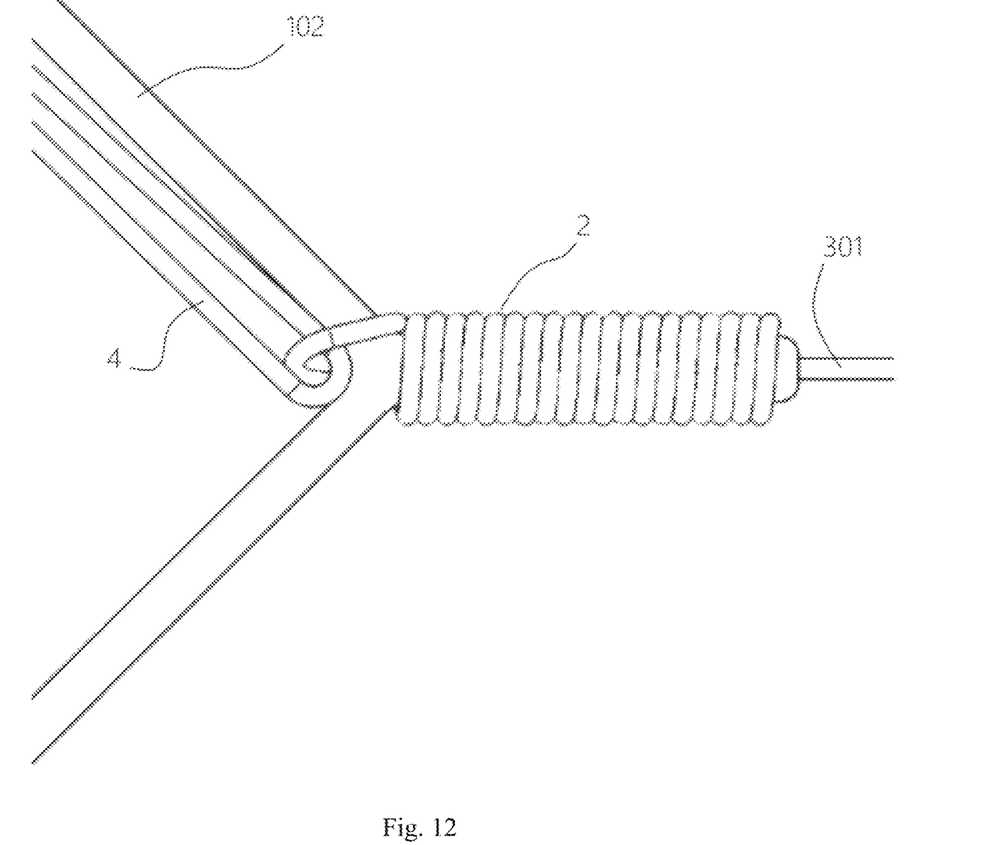
FIG. 12 is a main view of a radiopaque structure according to a second embodiment of the present invention.
Figure 13:
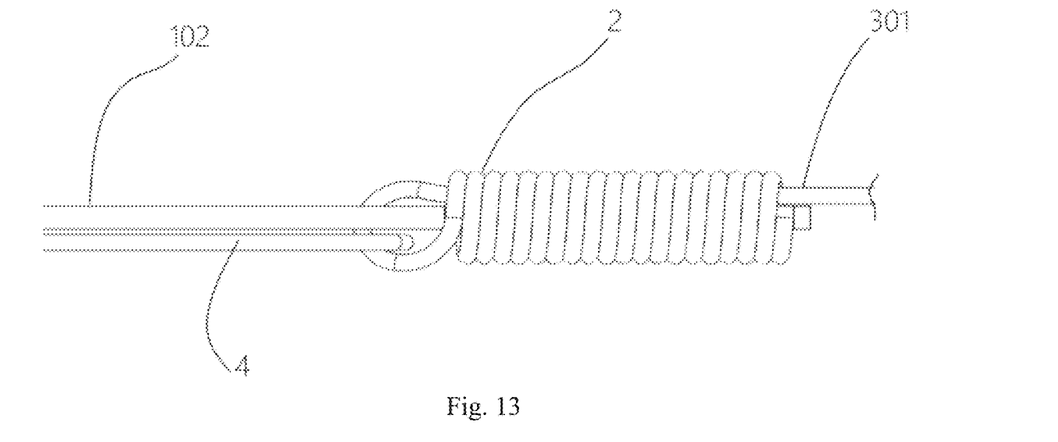
FIG. 13 is a front view of the radiopaque structure according to the second embodiment of the present invention.

FIG. 12 is a main view of a radiopaque structure according to a second embodiment of the present invention. FIG. 13 is a front view of the radiopaque structure according to the second embodiment of the present invention.

Referring to FIGS. 12 and 13, the second embodiment includes a rod 101 and a radiopaque sleeve 2, which are structured in the same way as those in the first embodiment. The rod 101 is disposed at a distal end 104 of a stent 11. Preferably, in the radiopaque structure according to the second embodiment of the present invention, the radiopaque sleeve 2 may also be a radiopaque spring, but a filler 3 included therein has a different structure from that of the first embodiment. Specifically, the filler 3 is provided by a first trailing end 301, which is integrally joined to the radiopaque spring. The radiopaque structure of the second embodiment further includes a body radiopaque wire 4.

The second embodiment also provides a method of interconnecting the rod 101, the radiopaque sleeve 2, the filler 3 and the body radiopaque wire 4 in the radiopaque structure, which includes the steps detailed below.

The radiopaque spring is disposed over the rod 101.

The first trailing end 301 is passed through a gap between the radiopaque spring and the rod 101. As shown in FIGS.

12 and 13, the first trailing end 301 of the radiopaque spring may be wound around a lower end 105 of the rod and passed through between, near the junction of, two struts 102 that define a V-like shape to the other end of the rod 101. The first trailing end 301 may be wrapped around the junction and then passed through the interior of the radiopaque spring toward a free end 107 of the rod 101. Wrapping the first trailing end 301 around the junction can avoid the formation of a free metal wire end at a proximal end 103 of the stent 11. Instead, a smooth transition will be present, which can reduce damage to the endothelium of a blood vessel.

As shown in FIG. 12, the body radiopaque wire 4 is spiraled in such a manner that its one end is passed through and hooked about the wrapped ring of the first trailing end 301 at the distal end 104 of the stent 11 and that it then follows the same path that it follows to the distal end 104 back to the proximal end 103 of the stent 11. Thus, the body radiopaque wire 4 is a "double-strand" wire containing an amount of material (and hence a weight, volume and density) twice that of any other body radiopaque wire 4 in the stent 11, imparting greater fluoroscopic visibility to the stent's distal end portion 104.

Embodiment 3

Figure 14:
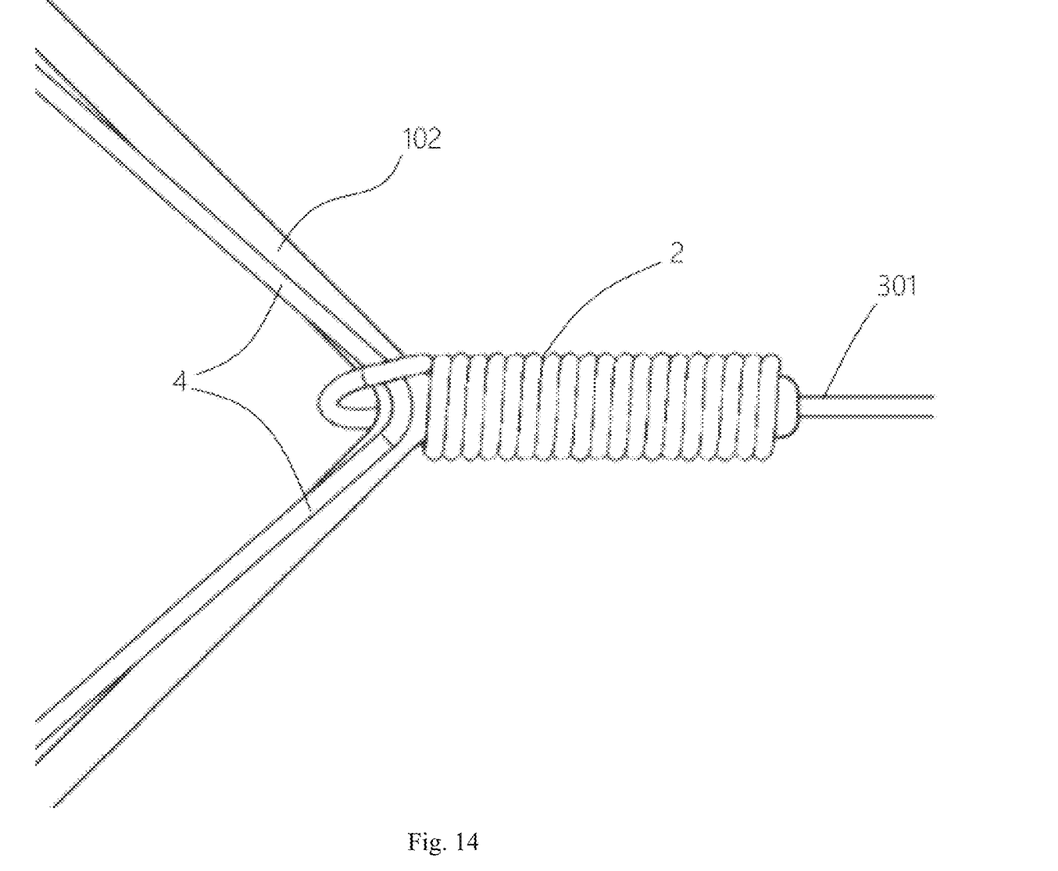
FIG. 14 is a main view of a radiopaque structure according to a third embodiment of the present invention.
Figure 15:
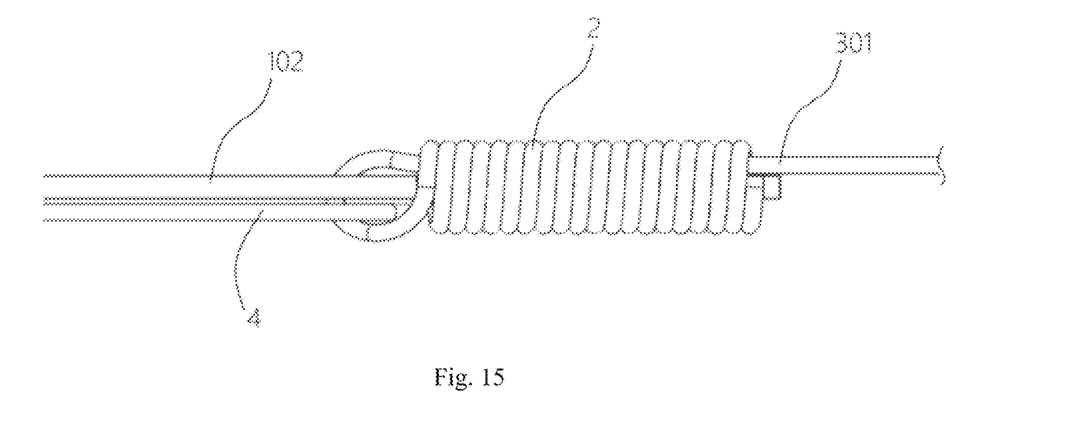
FIG. 15 is a front view of the radiopaque structure according to the third embodiment of the present invention.
Figure 16:
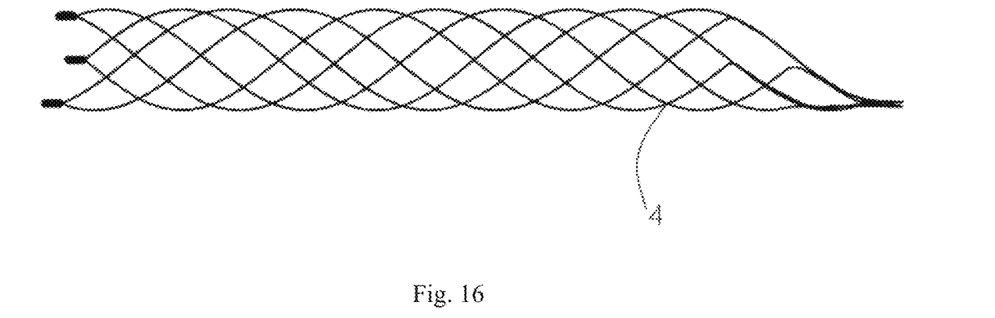
FIG. 16 is a schematic diagram illustrating the structure of the radiopaque structure according to the third embodiment, including body radiopaque wires in a stent.

FIG. 14 is a main view of a radiopaque structure according to a third embodiment of the present invention. FIG. 15 is a front view of the radiopaque structure according to the third embodiment of the present invention. FIG. 16 is a schematic diagram illustrating the structure of the radiopaque structure according to the third embodiment, including body radiopaque wires in a stent.

Referring to FIGS. 14 to 16, the radiopaque structure according to the third embodiment of the present invention includes a rod 101 and a radiopaque sleeve 2, which are structured in the same way as those in the first embodiment. The rod 101 is disposed at a distal end 104 of the stent 11. Preferably, in the radiopaque structure according to the third embodiment of the present invention, the radiopaque sleeve 2 may also be a radiopaque spring, and a filler 3 included therein may be structured in the same way as that of the second embodiment. That is, the filler 3 is also provided by a first trailing end 301 of the radiopaque spring. However, the rod 101, the radiopaque sleeve 2, the filler 3 and the body radiopaque wire 4 in the radiopaque structure are interconnected in a different manner from the second embodiment, as described in detail below.

The radiopaque spring is disposed over the rod 101.

The first trailing end 301 is passed through a gap between the radiopaque spring and the rod 101. As shown in FIGS. 14 and 15, the first trailing end 301 of the radiopaque spring may be wound around a lower end 105 of the rod and passed through between, near the junction of, two struts 102 that define a V-like shape to the other end of the rod 101. The first trailing end 301 may be wrapped around the junction and then passed through the interior of the radiopaque spring toward a free end 107 of the rod 101.

As shown in FIGS. 14 and 15, one body radiopaque wire 4 is spiraled to the distal end 104 on one side of one of the struts 102 of the stent 11, passed through and hooked about the wrapped ring of the first trailing end 301, and spiraled on the other side of the other strut 102 back to a proximal end 103 of the stent 11. In this way, with the same number of body radiopaque wires 4, the radiopaque structure according to the third embodiment of the present invention can effectively enhance fluoroscopic visibility of the stent by making each metal strut therein fluoroscopically visible. There may be three body radiopaque wires 4, and the radiopaque structure may be as shown in FIG. 16.

Embodiment 4

Figure 17:
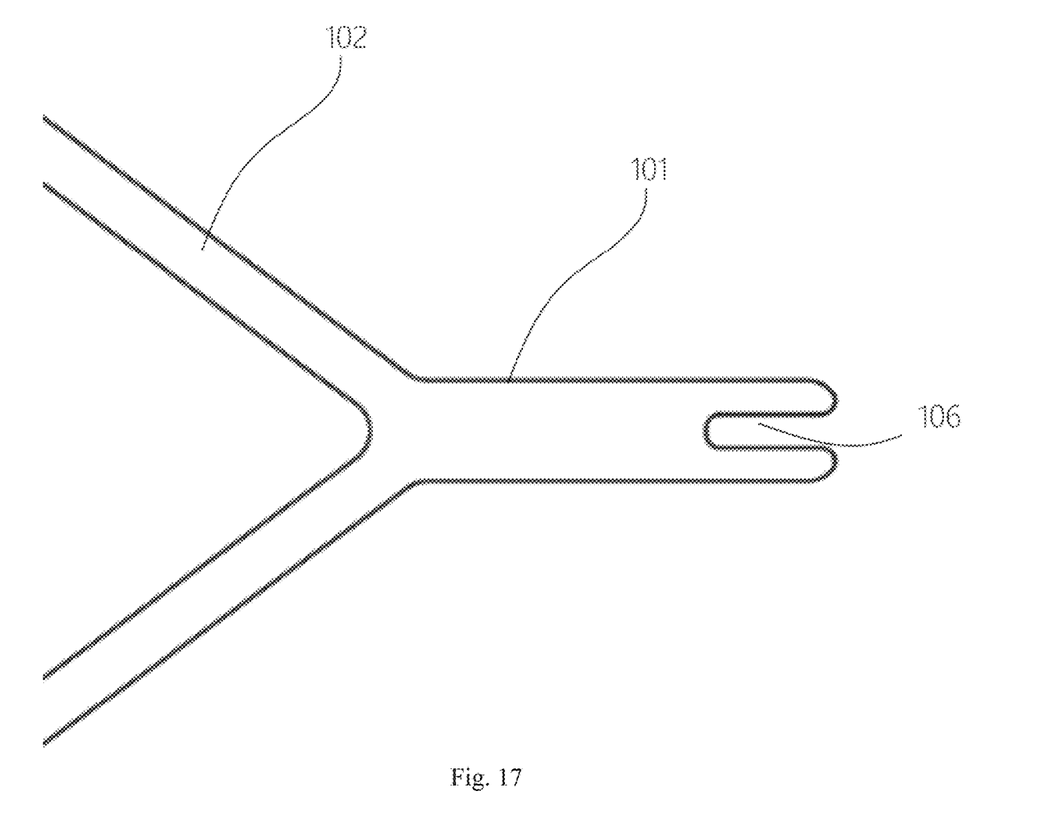
FIG. 17 is a schematic diagram illustrating the structure of a free rod in a radiopaque structure according to a fourth embodiment of the present invention.
Figure 18:
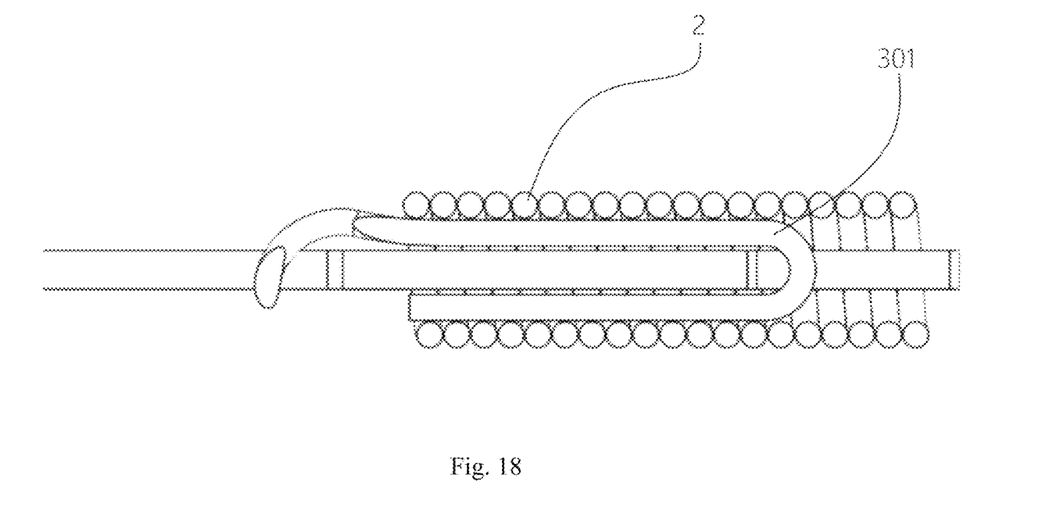
FIG. 18 is a cross-sectional view of the radiopaque structure according to the fourth embodiment of the present invention.

FIG. 17 is a schematic diagram illustrating the structure of a free rod in a radiopaque structure according to a fourth embodiment of the present invention. FIG. 18 is a cross-sectional view of the radiopaque structure according to the fourth embodiment of the present invention.

Referring to FIGS. 17 and 18, the radiopaque structure according to the fourth embodiment of the present invention includes:

at least one protrusion for securing, supporting and connecting a radiopaque sleeve 2. The at least one protrusion is at least one rod 101 provided at the at least one end of the stent 11.

The free end 107 of the rod 101 may either have a smooth transition, or be notched or slotted. In the case of being notched, one or more notches of any suitable shape can be formed, and in the case of being slotted, one or more slots of an oval or any other suitable shape may be formed, as long as a filler can be filled in a gap between the radiopaque sleeve and the protrusion. As shown in FIG. 17, in the radiopaque structure according to the fourth embodiment of the present invention, the free end 107 of the rod 101 is preferably notched 106 or slotted.

At least one radiopaque sleeve 2 is disposed over the at least one protrusion. The radiopaque sleeve 2 is a hollow structure, the radiopaque sleeve 2 is such as a radiopaque tube or spring. As shown in FIG. 18, in the radiopaque structure according to the fourth embodiment of the present invention, the radiopaque sleeve 2 is preferred to be a radiopaque spring.

At least one filler 3 is filled in the gap between the radiopaque sleeve 2 and the protrusion. The filler 3 may be provided by any of a first trailing end 301, a second trailing end 302, at least one separate radiopaque wire and a polymer filling material, or a combination thereof. In the radiopaque structure according to the fourth embodiment of the present invention, the filler 3 is preferably provided by the first trailing end 301 or the second trailing end 302. The filler 3 may be alternatively provided by first trailing ends 301 and/or second trailing ends 302 of multiple wires, which can impart even greater fluoroscopic visibility. The first trailing end 301 may be integrally joined to the radiopaque spring. In this embodiment, the second trailing end 302 is integrally joined at its opposing ends to two separate body radiopaque wires 4.

The fourth embodiment also provides a method of interconnecting the rod 101, the radiopaque sleeve 2, the filler 3 and the body radiopaque wires 4 in the radiopaque structure, which includes the steps detailed below.

The radiopaque spring is disposed over the rod 101.

When the filler 3 is provided by the first trailing end 301, the first trailing end 301 is passed through the gap between the radiopaque spring and the rod 101. As shown in FIGS. 17 and 18, the first trailing end 301 may be wound around a lower end 105 of the rod and passed through between, near the junction of, two struts 102 that define a V-like shape, thereby forming a closed loop around the junction. The first trailing end 301 may be passed through the interior of the radiopaque spring to the other end of the rod 101 (i.e., the free end 107). The first trailing end 301 may be then bent over around the free end 107 of the rod 101 so as to extend through the notch or slot at the free end 107 of the rod 101 to the other side of the rod 101 and further back to the lower end 105 of the rod 101. Subsequently, it may be welded to the lower end 105 of the rod 101, resulting in the formation of a second closed loop by the rod 101 and the radiopaque spring. In this design, the first trailing end 301 is clamped in the gap on opposing sides of the rod 101 in the radiopaque spring. In this way, the radiopaque spring and the first trailing end 301 form a self-locking structure by virtue of strong friction therebetween. The aforementioned second closed loop increases tensile strength of the radiopaque spring and reduces the risk of its falling off the distal end 104 of the stent 11. Alternatively, after the first trailing end 301 is bent over around the free end 107 of the rod 101 while extending through the notch or slot, instead of being welded to the lower end 105 of the rod, the first trailing end may be integrally joined to a body radiopaque wire which may be wound around the struts 102 to enhance fluoroscopic visibility of the stent 11. In this case, the portion of the first trailing end 301 extending inside the radiopaque sleeve 2 provides the filler 3, and the body radiopaque wire 4 joined to the first trailing end 301 and wound around the struts 102 may be either fixed to a proximal end 103 of the stent 11, or wound to a certain location of the stent 11 and then again back to the rod 101 and fixed thereto. In the case of the first trailing end 301 being welded to the lower end of the rod, a separate body radiopaque wire 4 may be wound on a body of the stent. Preferably, the body radiopaque wire 4 may pass through the welding joint of the welded joint of the first trailing end 301 and the lower end. In the radiopaque structure according to the fourth embodiment of the present invention, the body radiopaque wire 4 may employ any of several designs including those adopted in the second embodiment ("double-stranded") and the third embodiment (passed through the coil portion and spiraled along the other strut 102 back to the proximal end 103 of the stent 11).

When the filler 3 is provided by the second trailing end 302 fixed to two separate body radiopaque wires 4 at its opposing ends, the second trailing end may be passed through the gap between the radiopaque spring and the rod 101 and then bend over so as to extend through the notch or slot at the free end 107 of the rod 101 to the other side of the rod 101 and further back to the lower end 105 of the rod 101. In this way, the second trailing end 302 is held in the gap on both sides of the rod 101 inside the radiopaque spring. The body radiopaque wires 4 joined to the opposing ends of the second trailing end 302 may be wound on the body of the stent along the same or different paths.

Embodiment 5

A radiopaque structure according to a fifth embodiment of the present invention includes:

at least one protrusion, at least one radiopaque sleeve 2 and at least one filler 3. The at least one protrusion is at least one rod 101 provided at the at least one end of the stent 11. In the radiopaque structure rod 101 according to the fifth embodiment of the present invention, the radiopaque sleeve 2 is structured in the same way as that of the first embodiment, but the filler 3 is a polymer structure containing a radiopaque powder. The polymer may be any polymer with satisfactory biocompatibility, and the radiopaque powder is a mixture of any one or more of a gold powder, a platinum powder, a tungsten powder, an iridium powder, a tantalum powder and a barium sulfate powder. A gap between the radiopaque sleeve 2 and the protrusion may be filled by the polymer structure. Alternatively, the filler 3 may be provided by separate radiopaque wire(s) filled in the gap between the radiopaque sleeve 2 and the protrusion. The number of the separate radiopaque wires may range from one to eight. Preferably, two such separate radiopaque wires are included in the radiopaque structure according to the fifth embodiment of the present invention.

The fifth embodiment also provides a method of interconnecting the rod 101, the radiopaque sleeve 2, the filler 3 and the body radiopaque wires 4 in the radiopaque structure, which includes the steps detailed below.

The radiopaque spring is disposed over the rod 101.

The polymer structure or the several separate radiopaque wires are filled in the gap between the radiopaque sleeve 2 and rod 101. In this embodiment, the radiopaque wires may be wound from a proximal end 103 of the stent 11 to a distal end 104 thereof.

The above radiopaque structures provided in accordance with the present invention can effectively enhance fluoroscopic visibility of stents, in particular those for use in thrombectomy. They can facilitate operation of a physician during a surgical procedure by helping him/her determine the position of a stent and its release and local expansion conditions, as well as entrapment conditions of a thrombus by metal struts of the thrombectomy device. The radiopaque structures of the present invention can be used in all types and brands of stents and are not limited to being used in thrombectomy devices.

The various technical features of the foregoing embodiments may be combined in any way. Although not all such combinations have been described above for the sake of brevity, any of them is considered to fall within the scope of this specification as long as there is no contradiction between the technical features.

Presented above are merely several embodiments of the present application. Although these embodiments are described with some particularity and in some detail, it should not be construed that they limit the scope of the present application in any sense. It is to be noted that various variations and modifications can be made by those of ordinary skill in the art without departing from the concept of the present application. Accordingly, it is intended that all such variations and modifications are embraced within the scope of this application as defined in the appended claims.

What is claimed is:

1. A radiopaque structure for use in a stent, wherein the radiopaque structure comprises:
    at least one radiopaque sleeve, the at least one radiopaque sleeve disposed over at least one protrusion;
    at least one filler, the at least one filler filled in a gap between the radiopaque sleeve and the protrusion; wherein the filler is provided by filling wire(s) and/or a polymer filling material mixed with a radiopaque material, the filling wire(s) including a radiopaque wire which extend from the radiopaque sleeve and/or a separate radiopaque wire; and/or wherein the separate radiopaque wire has a length of from 10 mm to 100 mm.

2. The radiopaque structure of claim 1, further comprising at least one body radiopaque wire.

3. The radiopaque structure of claim 2, wherein the body radiopaque wire is wound along one of struts defining mesh openings in the stent; and/or
    wherein a number of the body radiopaque wires on the stent is 0-8, each body radiopaque wires having a length of from 10 mm to 150 mm.

4. The radiopaque structure of claim 2, wherein the body radiopaque wire and the radiopaque sleeve are made of a same material or different materials.

5. The radiopaque structure of claim 4, wherein the body radiopaque wire is made of a wire material, wherein the wire material of the body radiopaque wire is a pure metal and/or an alloy radiopaque to X-ray radiation and has a diameter of 0.01 mm to 0.1 mm.

6. The radiopaque structure of claim 2, wherein the filler is provided by filling wire(s) and/or a polymer filling material mixed with a radiopaque material, the filling wire(s) including one or more of a radiopaque wire which extend from the radiopaque sleeve, an extension of the body radiopaque wire and a separate radiopaque wire; and/or wherein the separate radiopaque wire has a length of from 10 mm to 100 mm.

7. The radiopaque structure of claim 6, wherein the filling wire(s) comprise(s) a first trailing end integrally joined to the radiopaque sleeve.

8. The radiopaque structure of claim 7, wherein the first trailing end and the radiopaque sleeve are joined at a free end of the protrusion so that the radiopaque sleeve and the first trailing end form a first closed loop.

9. The radiopaque structure of claim 7, wherein the filling wire(s) comprise(s) a second trailing end integrally joined to the body radiopaque wire, wherein the filling wire(s) further comprise(s) a first trailing end integrally joined to the radiopaque sleeve, wherein the first trailing end and the second trailing end are inserted in the gap between the protrusion and the radiopaque sleeve, the second trailing end, the radiopaque sleeve and the protrusion are welded together at the free end of the protrusion to form a single closed end structure.

10. The radiopaque structure of claim 7, wherein the radiopaque structure comprises a body radiopaque wire, wherein the protrusion is at least one rod provided at at least one end of the stent, wherein the rod is connected to a strut in the stent, wherein the first trailing end is wound around a lower end of the rod and inserted into a gap between the radiopaque sleeve and the rod, the first trailing end having a wrapped ring around the lower end of the rod, and wherein the body radiopaque wire is wound along the strut and then hooked about the wrapped ring of the first trailing end.

11. The radiopaque structure of claim 10, wherein the body radiopaque wire is wound on one side of the stent strut, hooked about the wrapped ring of the first trailing end around the lower end of the rod and then the body radiopaque wire is wound along a same path back on the same side of the strut; or wherein the body radiopaque wire is wound on one side of the stent strut, hooked about the wrapped ring of the first trailing end around the lower end of the rod and then the body radiopaque wire is wound along a different path on the other side of the strut.

12. The radiopaque structure of claim 7, wherein the radiopaque sleeve is a radiopaque spring, wherein the protrusion is at least one rod provided at at least one end of the stent, wherein the rod is connected to a strut in the stent, and wherein the first trailing end is wound around a lower end of the rod, inserted into a gap between the radiopaque sleeve and the rod, wound back around a free end of the rod, and again inserted into the gap between the radiopaque spring and the rod; or wherein the radiopaque sleeve is a radiopaque spring, wherein the protrusion is at least one rod provided at at least one end of the stent, wherein the rod is connected to a strut in the stent, and wherein the first trailing end fills the gap between the radiopaque spring and the rod and then extends as the body radiopaque wire wound along the strut.

13. The radiopaque structure of claim 1, wherein the at least one protrusion is at least one rod provided at at least one end of the stent.

14. The radiopaque structure of claim 13, wherein a free end of the at least one rod is notched or slotted.

15. The radiopaque structure of claim 14, wherein a number of the notching or slotting is at least one; and/or wherein the at least one rod has any one of an arched shape, a crescent shape, a zigzag shape, a tapered shape, a trapezoidal shape and an oval shape.

16. The radiopaque structure of claim 1, wherein the at least one protrusion is integrally formed with or fixedly connected to the stent.

17. The radiopaque structure of claim 1, wherein the radiopaque sleeve is a radiopaque tube or a radiopaque spring, wherein the radiopaque spring is fabricated from a wire material and has an inner diameter of from 0.03 mm to 1 mm, and wherein the wire material is a pure metal and/or an alloy radiopaque to X-ray radiation and has a diameter of 0.01 mm to 0.1 mm.

18. A stent, the stent comprising the radiopaque structure of claim 1, wherein the protrusion is fixedly connected to or integrally formed with the stent.

19. A thrombectomy system comprising the stent of claim 18.

* * * * *